United States Patent [19]

Gidaspow et al.

[11] 3,953,575

[45] Apr. 27, 1976

[54] IRON OXIDE SORBENTS FOR REGENERATIVE SORPTION OF $NO_x$

[75] Inventors: Dimitri Gidaspow; Linus Leung, both of Chicago, Ill.

[73] Assignee: American Gas Association, Arlington, Va.

[22] Filed: Nov. 21, 1973

[21] Appl. No.: 417,829

[52] U.S. Cl.................................. 423/212; 423/239
[51] Int. Cl.². ......................................... B01D 53/00
[58] Field of Search................ 423/212, 213.5, 239, 423/400

[56] References Cited
UNITED STATES PATENTS

| | | | |
|---|---|---|---|
| 2,839,356 | 6/1958 | Karl | 423/239 |
| 3,382,033 | 5/1968 | Kitagawa | 423/239 |

FOREIGN PATENTS OR APPLICATIONS

| | | | |
|---|---|---|---|
| 16,068 | 1908 | United Kingdom | 423/400 |
| 166,095 | 1919 | United Kingdom | 423/400 |

OTHER PUBLICATIONS

"Chemical Abstracts;" Vol. 56, 1962 pp. 3743 g.

*Primary Examiner*—G. O. Peters
*Attorney, Agent, or Firm*—Allegretti, Newitt, Witcoff & McAndrews

[57] ABSTRACT

The use of iron oxide sorbents to remove oxides of nitrogen ($NO_x$) from gaseous mixtures containing small amounts of $NO_x$ such as the exhaust from an internal combustion engine or flue gases, without interference from carbon oxides or water vapor and thermally regenerable at relatively low temperatures, are disclosed. A preferred sorbent is supported ferric oxide for sorption of $NO_x$ from gaseous mixtures containing oxygen. Ferrous or ferrosoferric oxide sorbents are also suitable in the presence or absence of oxygen.

3 Claims, 3 Drawing Figures

RATE OF SORPTION OF NITRIC OXIDE ON SUPPORTED
FERRIC OXIDE (SORBENT "A") AT VARIOUS TEMPERATURES

SORPTION OF $NO_2$ ON VARIOUS SORBENTS IN A PACKED TUBE

SORPTION OF NITROGEN DIOXIDE ON FERRIC OXIDE, NICKEL OXIDE AND LEAD DIOXIDE RESPECTIVELY AT 115°C SHOWING REGENERABILITY

IRON OXIDE SORBENTS FOR REGENERATIVE SORPTION OF $NO_x$

BACKGROUND OF THE INVENTION

This invention relates to the removal of oxides of nitrogen ($NO_x$) from hot or cold gas mixtures. More particularly, this invention relates to the removal of oxides of nitrogen from combustion gases, particularly exhaust gases from internal combustion engines.

A common form of pollution exists where automotive traffic is heavy and meteorological temperature inversions are common. This form of pollution is customarily referred to as "smog" although it is not a true mixture of smoke and fog.

Visually, smog does not resemble fog but is more like a heavy haze. It has a distinct ordor and is irritating to mucous membranes, particularly of the eyes. It markedly reduces visibility, causes ozone formation and brings about serious damage to certain species of plants. The principal source of smog is the exhaust gas from internal combustion engines. However, flue gases from industrial sources also contribute to the formation of smog conditions. Smog is the product of sunlight-induced atmospheric reactions of organic compounds with oxides of nitrogen such as the rection of hydrocarbons and $NO_x$ as produced in an internal combustion engine.

The hydrocarbons in exhaust gases arise from the incomplete combustion of the fuel. The nitrogen oxides result from the fixation of nitrogen during combustion and are formed during all phases of operation in the internal combustion engine. Their concentration in the exhaust gases varies from low levels, i.e. 20 p.p.m., at idle motor conditions, to high levels, i.e. 1000 p.p.m., or more, during acceleration.

Most of the total oxides of nitrogen emitted in automotive exhaust are present as nitric oxide (NO) which is readily converted to nitrogen dioxide ($NO_2$) in the atmosphere. The dioxide absorbs ultraviolet radiation in sunlight and is dissociated into a nitric oxide molecule and an oxygen atom. The oxygen atom enters into chemical reactions with the organic constituents of exhaust gases, particularly the hydrocarbons. Furthermore, the photolysis of nitrogen dioxide ($NO_2$) appears to be important in ozone formation. Accordingly, it is desirable to remove $NO_x$ from flue gases and automobile exhaust to control air pollution.

DESCRIPTION OF PRIOR ART

The removal of $NO_x$ from combustion gases, particularly automobile exhaust gases and flue gases, will substantially reduce the formation of smog and its undesirable side effects. Much of the effort in connection with reducing pollution from mobile sources, such as automobiles, has gone into the development of catalytic reactors. However, to decompose nitrogen oxide into harmless nitrogen and oxygen catalytically, requires a reducing atmosphere. This requires operating the engine at less than optimum efficiency and the reduction of the $NO_x$ in a first reactor. Further, because of the oxygen lean conditions present, carbon monoxide is inevitably produced and must be converted in a second reactor into harmless carbon dioxide by the addition of excess air. Furthermore, some catalysts intended to decompose the nitrogen oxide to nitrogen in the first reactor can produce ammonia instead. The ammonia thus produced in the first reactor will then oxidize in the second reactor giving back toxic nitric oxides. In addition, certain catalysts containing nickel may actually produce air pollution by emission of microscopic catalytic particles.

Sorbents had also been used for removing nitric oxide from gases. Gidaspow and Onischak "Regenerative Sorption of Nitric Oxide. A concept for Environmental Control and Kinetics of Ferrous Sorbents." Can J. Chem. Eng., Vol 51, June 1973, had successfully used ferrous sulfate mixed with silica gel. However, to prevent a slow aging of the sorbent by oxidation an expensive catalyst, platinum, was added to restore the activity of the sorbent by treatment, with hot reducing gases. The gases had also to be cooled to near room temperature for best sorption.

Molecular sieves can also sorb NO and can be regenerated. Molecular sieves are known to sorb water preferentially to other gases and are therefore considered only for industrial applications such as nitric acid plants. However, in U.S. Pat. No. 3,015,369, a specifically treated molecular sieve is used to reduce the $NO_x$ content of internal combustion engine exhaust gases at 400°–600°C. Lower temperatures are shown in this patent to be practically unsuitable.

A ferric oxide-sodium oxide sorbent is used in U.S. Pat. No. 2,684,283, as a sorbent for nitric oxide (NO). This sorbent functions by reaction with the nitric oxide at 300°–500°C, to form a nitrate that is regenerated at high temperatures on the order of 700°C. The high temperatures required are not practical for a typical passenger automobile.

Further, when used to recover $NO_x$ from a flue gas or automotive exhaust, the sodium oxide will react with $CO_2$ inevitably present, to form a stable carbonate and lower the effectiveness of the sorbent to zero after several regenerations.

Otto and Shelf, "The Adsorption of Nitric Oxide on Iron Oxides," J. Catalysis 18, 184–192 (1970), experimented with iron oxides as catalysts for decomposition of nitric oxide. Included in their study was the sorption of pure nitric oxide on iron oxide. However, in their study of adsorption of pure nitric oxide, they report that the sorption is substantially irreversible and speak of inhibition by oxygen.

SUMMARY OF THE INVENTION

It is an object of this invention to provide a process for the sorption of $NO_x$, from dilute gas streams containing $NO_x$ on a readily available inexpensive sorbent, at low temperatures such as in the range of about 0°C – 350°C and thermally regenerating the sorbent at slightly higher yet relatively low temperatures such as in the range of 400° – 500°C.

It is another object of this invention to provide a process for the sorption of $NO_x$ from dilute gas streams containing $NO_x$ in the presence of carbon dioxide and water vapor.

It is a further object of this invention to provide a process for the efficient sorption of $NO_x$ in the presence of oxygen.

It is a specific object of this invention to provide a process for the efficient sorption of $NO_x$ from an automobile exhaust to provide a highly concentrated $NO_x$ gas mixture which can be returned to the internal combustion engine to react with the fuel or is thermally decomposed.

A specific class of iron oxide sorbents for the sorption of $NO_x$ have been discovered which can sorb $NO_x$ from gas streams containing small amounts of $NO_x$ (i.e. 50 – 1000 p.p.m.) and which can be regenerated at low temperatures, such as about 400°C – 500°C, preferably 400°C – 450°C. This sorbent comprises ferric oxide, ferrous oxide or ferrosoferric oxide supported on a porous inert support such as alumina. Ferrous or ferrosoferric oxide sorbs $NO_x$ better than ferric oxide in the absence of oxygen. However, at high temperatures (i.e. above 200°C), it was discovered that ferric oxide, in the presence of oxygen, is a particularly effective, facile, regenerable sorbent for $NO_x$. These iron oxide sorbents are not affected by carbon dioxide and water vapor. As a consequence, these sorbents are particularly effective for removing $NO_x$ from automobile exhausts containg about 2% oxygen. This enables the engine to operate with excess air for combustion thereby producing maximum power with minimum unburned fuel and carbon monoxide in the exhaust. Although this results in increased $NO_x$ production, the $NO_x$ produced is readily removed by contact with the supported ferrous or ferric oxide sorbents to produce a "clean exhaust".

Accordingly, in a broad embodiment, this invention relates to the removal of oxides of nitrogen ($NO_x$) from gas streams containing small amounts of $NO_x$ (50–1000 p.p.m.) such as the exhaust from an internal combustion engine or a flue gas stream. This removal process includes contacting the $NO_x$ containing gas stream with an iron oxide sorbent supported on a porous support such as alumina under conditions sufficient to sorb the $NO_x$. Preferably the sorption conditions include a sorption temperature of about 0°C to about 350°C and the presence of $O_2$ (about 1% minimum) when ferric oxide is the sorbent. Oxygen need not be present when reduced iron oxide is used, i.e. ferrous or ferrosoferric oxide. After the $NO_x$ is sorbed on the iron oxide the sorbent step is terminated and the sorbent regenerated to produce a gas stream containing concentrated amounts of $NO_x$. Preferably the sorbent is regenerated by thermal regeneration at about 400°C to about 500°C with or without the presence of a purge inert gas stream. When a reduced iron oxide is used as a sorbent, the sorbent may be periodically reduced, such as with CO or $H_2$, to maintain the iron oxide in a reduced state.

Other objects and embodiments will become apparent from the following more detailed description of the invention.

DETAILED DESCRIPTION OF THE INVENTION

Figure 1:
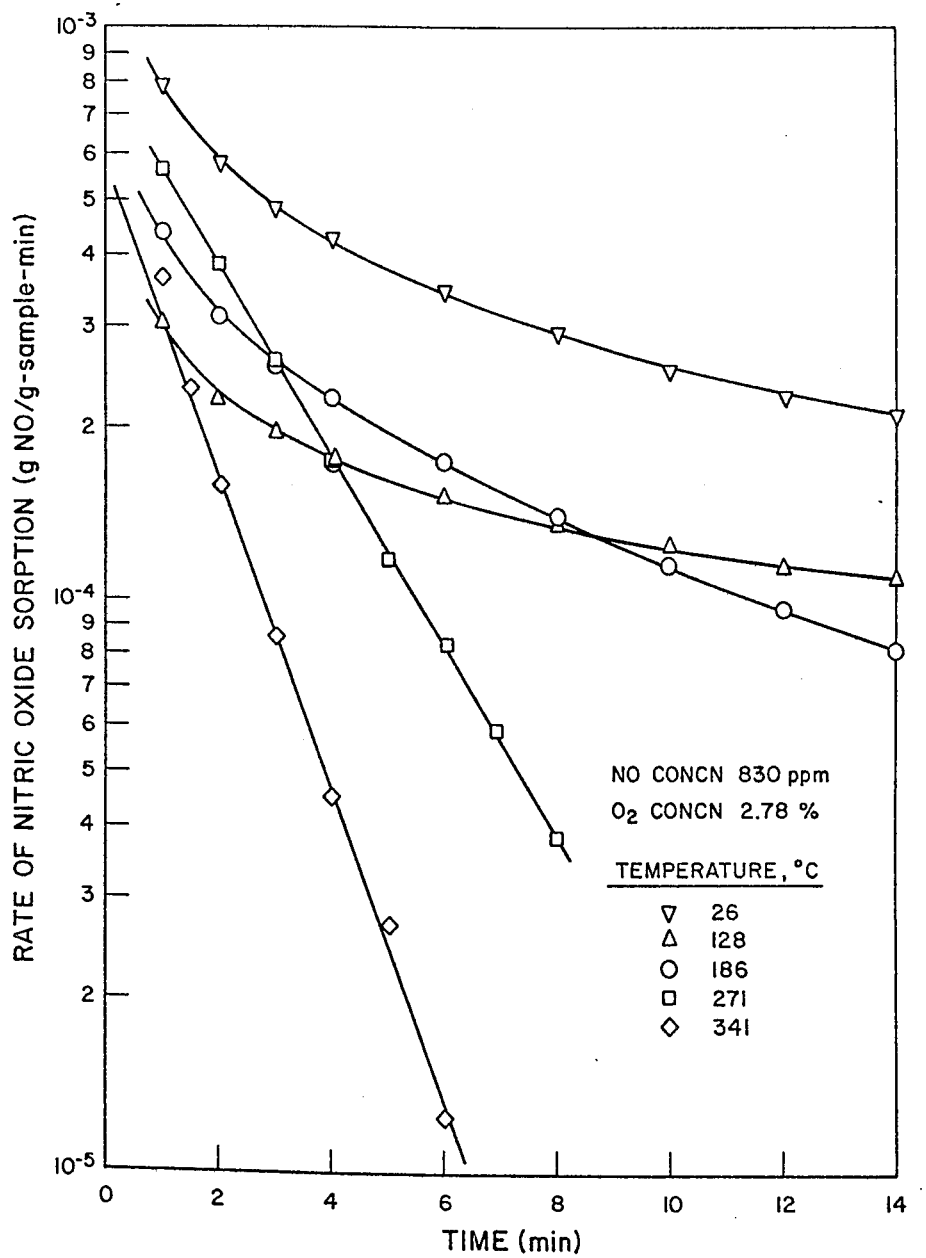

As indicated the sorbent to be utilized in the process of the present invention comprises a porous carrier material or support having combined therewith effective amounts of iron oxide, i.e. either ferrous and/or ferric oxide. Considering first the porous carrier material utilized, it is preferred that the material be a porous, adsorptive, high-surface area support having a surface area of about 25 to about 500 m²/gm. The porous carrier material should be relatively refractory to the conditions utilized in the sorbtion and regeneration steps. It is intended to include within the scope of the present invention carrier materials which have traditionally been utilized as catalytic or sorbent supports such as (1) activated carbon, coke, or charcoal; (2) silica or silica gel, silicon carbide, clays, and silicates including those synthetically prepared and naturally occurring, which may or may not be acid treated, for example, attapulgus clay, china clay, diatomaceous earth, fuller's earth, kaolin, kieselguhr, etc.; (3) ceramics, procelain, crushed firebrick, bauxite; (4) refractory inorganic oxides such as alumina, titanium dioxide, zirconium dioxide, chromium oxide, zinc oxide, magnesia, thoria, boria, silica-alumina, silica-magnesia, chromia-alumina, alumina-boria, silica-zirconia, etc.; (5) crystalline aluminosilicates such as naturally occurring or synthetically prepared mordenite and/or faujasite, either in the hydrogen form or in a form which have been treated with multivalent cations; and (6) combination of elements from one or more of these groups.

The preferred porous carrier materials for use in the present invention are refractory inorganic oxides, with best results obtained with an alumina carrier material. Suitable alumina materials are the crystalline aluminas known as the gamma-, eta-, and theta-aluminas. In addition, the alumina carrier material may contain minor proportions of other well known refractory inorganic oxides such as silica, zirconia, magnesia, etc.; however, the preferred support is substantially pure alumina.

Preferred carrier materials have an apparent bulk density of about 0.3 to about 0.7 gm/cc and surface area characteristics such that the average pore diameter is about 20 to 300 Angstroms, the pore volume is about 0.1 to about 1 ml/gm and the surface area is about 100 to about 500 m²/gm. Excellent results can be obtained with an alumina carrier material which is used in the form of spherical particles having a relatively small diameter (i.e., typically about one-sixteenth inch), an apparent bulk density of about 0.5 gm/cc, a pore volume of about 0.4 ml/gm, and a surface area of about 175 m²/gm.

The preferred alumina carrier material may be prepared in any suitable manner and may be synthetically prepared or natural occurring. Whatever type of alumina is employed it may be treated prior to use by one or more treatments including drying, mild calcination, steaming, etc., and it may be in a form known as activated alumina, activated alumina of commerce, porous alumina, alumina gel, etc.. For example, the alumina carrier may be prepared by adding a suitable alkaline reagent such as ammonium hydroxide to a salt of aluminum such as aluminum chloride, aluminum nitrate, etc., in an amount to form an aluminum hydroxide gel which upon drying and calcining is converted to alumina. The alumina carrier may be formed in any desired shape such as spheres, pills, cakes, extrudates, powders, granules, etc., and utilized in any desired size.

The iron oxide is deposited on the porous support by processes well known to those trained in the art. Preferably, the final composite contains about 5% to about 10%, by weight iron. Briefly, the iron can be incorporated on the support by coprecipitation on cogellation with the porous carrier material or by impregnation of the carrier in any step of production. Preferably, the iron oxide is uniformly distributed throughout the porous carrier material.

As indicated, the iron oxide present on the porous support can be present as ferric oxide ($Fe_2O_3$) and/or in the reduced form (ferrous oxide (FeO) or ferrosoferric oxide ($Fe_3O_4$)). In general the reduced form yields initially higher rates and capacities. However, since the reduced form is generally prepared by first forming the ferric form, the ferric form is then reduced, preferably by a suitable reducing gas such as CO or $H_2$, and the reduced form is gradually oxidized in the presence of $O_2$ to the ferric form during use, the more readily available ferric form is preferred for purposes of economy. However, either form may be used. For example, the reduced form could be periodically reduced to convert any iron oxide present in the ferric form back to the ferrous or ferrosoferric form. For example, the ferric form could be reduced by contact with CO or $H_2$.

The supported ferric oxide sorbents are inexpensive, readily available items of commerce and have several important properties. They can sorb $NO_x$ at flue gas temperatures (i.e. 200°C – 350°C) as well as at temperatures as low as 0°C; they can be regenerated merely by the application of heat at about 400°–500°C; they are not appreciably affected by $CO_2$ or water vapor; and they effectively sorb $NO_x$ in the presence of oxygen. In fact, it has been found that oxygen must be present in the gas stream being treated to obtain an appreciable level of sorbtion on the ferric oxide sorbents. The gas stream treated should contain at least 1% by volume, $O_2$ and preferably contains at least 2% by volume, $O_2$, since it was discovered that increasing the $O_2$ concentration increased the sorbtion rate. As a consequence in the case of the ferric oxide sorbent, since $O_2$ must be present, some form of a reversible chemical reaction may occur rather than a simple physical adsorption or chemisorption. Further, since the rate of $NO_x$ sorbtion drops as a fraction of time and material balances for NO sorbed and NO desorbed agree, there does not appear to be a catalytic decomposition of the $NO_x$.

The sorption step can be affected at a temperature of about 0°C – 350°C, subatmospheric, atmospheric or superatmospheric pressures and for a time sufficient to sorb at least a portion of the $NO_x$ on the sorbent. Preferred are temperatures of 200°–350°C and atmospheric pressure.

The $NO_x$ sorbed on the sorbent is readily removed by simply heating the sorbent to a temperature of about 400°C – 500°C. If desired, the pressure imposed on the sorbent during regeneration can be lower than the pressure imposed during the sorption step and/or the sorbent can be purged with an inert gas such as nitrogen to hasten the time required for desorbtion.

Further, it was discovered that if the sorbent is overheated, such as exposure to temperatures greater than 700°C, the sorbtion properties of the sorbent are destroyed. Further, prolonged heating such as 5 hours or more at regeneration temperatures (400°C – 500°C) results in a decline in the activity of the sorbent. As a consequence, the sorbent must not be exposed at all to temperatures in excess of 700°C and the regeneration times at the preferred regeneration conditions of 400° – 500°C must be kept at a minimum such as below 5 hours and preferably below 2 hours.

In any event, after the completion of the desorbtion or regeneration step, the sorbent is again ready to sorb $NO_x$ and the sorption step is repeated.

DESCRIPTION OF PREFERRED EMBODIMENTS

EXAMPLE I

SORBENT "A"

In this example nitric oxide was found to be effectively sorbed by a supported ferric oxide catalyst powder Fe-0303 P, as supplied by Harshaw Chemical Co. in the presence of $O_2$. This sorbent is designated sorbent "A" and is a commercially available hydrogenation catalyst. The solid density of the powder is 8.86 gm/cc and the apparent bulk density is 1.09 gm/cc. The sorbent contains 6.4% of iron by weight with the balance being activated alumina. The BET surface area of the sorbent is 138 $m^2/g$. The size distribution of the catalyst is set forth below:

TABLE I

| Screen Sieve Analysis Retained on | Wt. % |
|---|---|
| 60 mesh | 1.9 |
| 80 mesh | 0.9 |
| 100 mesh | 0.8 |
| 120 mesh | 0.9 |
| 140 mesh | 1.5 |
| 170 mesh | 4.4 |
| 200 mesh | 11.8 |
| 230 mesh | 22.6 |
| 270 mesh | 1.9 |
| 325 mesh | 21.0 |
| pan | 32.3 |
|  | 100.0 |

Rate data were obtained in a packed tube containing 2.5 grams of sorbent "A". The total volume of the sorbent was 2.3 cc. The inlet and outlet concentrations of $NO_x$ were measured by a Lira infrared analyzer. The rate of reaction was computed as $$\text{rate} = Q p_u (C_{in} - C_{out}) / w \qquad 1$$

where
rate = rate of sorption (g NO/g sample-min)
$Q$ = volumetric flow rate (1 pm)
$p_g$ = density of NO (g/liter)
$w$ = weight of sorbent used (g)
$C_{in}$ = inlet concentration of $NO_x$ (mole fraction)
$C_{out}$ = outlet concentration of $NO_x$ (mole fraction)

The flow rate was fast enough so that the reactor behaved as a differential reaction. Calculations and data analysis are similar to those reported by Gidaspow and Onischak for nitric oxide sorption on ferrous sulfate and for $CO_2$ sorption on alumina supported potassium carbonate. "Dimitri Gidaspow and Michael Onischak, 'Regenerative Sorption of Nitric Oxide. A Concept for Environmental Control and Kinetics of Ferrous Sorbents.' Can. J. Chem. Eng., Vol. 51, June (1973)." "M. Onischak and D. Gidaspow, 'Part II. Regenerative Separation of $CO_2$' in 'Recent Developments in Separation Science,' Vol. II, p 71–93, N.N. Li, ed., Chemical Rubber Co., Cleveland (1972)."

The rate of sorption at 270°C or higher drops exponentially with time (see FIG. 1). The rate data for each run can be described by the following equation $$\text{rate} = A e^{-B t} \qquad 2$$

where
$t$ = time (min)
$A, B$ = constants

Both A and B depend on NO concentration linearly. The least square fit for all data at different NO concentrations at 270°C with 2.8% $O_2$ is $$R = 0.713 \times 10^{-6} \cdot C_{NO} \cdot e^{-(0.285 \times 10^{-3} \cdot C_{NO} + 0.149)t} \qquad 3$$

where
$C_{NO}$ = concentration of NO (ppm)

The integral of this rate gives the total amount sorbed as a function of NO concentration. The value of the integral is $$\frac{.713 \times 10^{-6} \cdot C_{NO}}{.285 \times 10^{-3} \cdot C_{NO} + 0.149}$$

At a fixed NO concentration the value of B in Equation (2) depends on $O_2$ concentration linearly while the value of A is some increasing function of $O_2$ concentration. At 270°C and 350 ppm NO concentration we have $$\text{rate} = A(C_{O_2})\, e^{-(0.0327 \cdot C_2 + 0.153)t} \qquad 4$$

where $C_{O_2}$ = concentration of $O_2$ (mole %)

The dependence of A on $C_{O_2}$ is given in Table II.

Notice that the constant 0.153 from data on variation of NO concentration and the constant 0.149 from data on variation of $O_2$ are not significantly different. Therefore, the rate of sorption can be expressed as $$\text{rate} = N(C_{O_2})\, C_{NO}\, e^{-(k \cdot C_{O_2} \cdot C_{NO} + K^1)t}$$

where $k = 0.97 \times 10^{-4}$ min$^{-1}$ %$^{-1}$ ppm$^{-1}$
$k^1 = 0.150$ min$^{-1}$
$N(C_{O_2})$ is given in Table II

TABLE II

Dependence of Initial Rate on Oxygen Concentration

| $O_2$ Concentration (%) | Initial Rate at NO=350 ppm (g NO/g sample-min) | N (gNO/g sample-min-ppm) |
|---|---|---|
| 0 | 0.3 × 10$^{-4*}$ | 0.086 |
| 2.06 | 2.82 × 10$^{-4}$ | 0.81 |
| 3.35 | 2.85 × 10$^{-4}$ | 0.82 |
| 7.7 | 3.06 × 10$^{-4}$ | 0.88 |
| 9.65 | 5.55 × 10$^{-4}$ | 1.57 |
| 12.8 | 6.48 × 10$^{-4}$ | 1.85 |

*essentially zero within experimental error

It was found that the supported sorbents studied can be regenerated with no apparent loss in activity, except when overheated beyond 700°C. A typical regeneration procedure was as follows:

The sorbent was heated up rapidly from the temperature of sorption to about 450°C while pure nitrogen flowed through the sorbent. The outlet concentration of $NO_x$ was monitored. The regeneration was considered complete when no more $NO_x$ can be detected in the outlet stream and the sorbent was ready to sorb nitric oxide again with no loss in activity. NO has been sorbed and desorbed with the sorbent used in this invention a multitude of times without losing effectiveness.

To further illustrate the capacity of sorbent "A" some typical break-through data is presented

| | |
|---|---|
| Temperature | 275°C |
| Flowrate | 0.7 lpm |
| Wt. of sample | 6.052 g |
| Space velocity | 7650 hr$^{-1}$ |
| Nitric oxide conc. | 830 ppm |
| Oxygen conc. | 2.78% |
| time to break through | 1.8 min |

| Time (min) | Outlet conc. (ppm) |
|---|---|
| 2 | 10 |
| 4 | 205 |
| 6 | 450 |
| 8 | 588 |
| 10 | 640 |
| 12 | 668 |
| 14 | 684 |
| 16 | 705 |

Capacity to break through is 2.32 × 10$^{-4}$ g NO/g sample

Capacity to $(C_{out}/C_{in}) = 0.85$ is 9.35 × 10$^{-4}$ g NO/g sample

Total capacity from integrating the rate data is 1.64 × 10$^{-3}$ gNO/g sample

EXAMPLE II

Sorbent "B"

Sorbent "B" was prepared by impregnating an inert porous alumina carrier with an aqueous solution of ferric nitrate and decomposing the nitrate at 500°C for 5 hours. The carrier was a chromatogrphic alumina (F - 20, supplied by ALCOA). The resultant sorbent was sieved and only those particles that fell through a 100 mesh sieve and were retained on a 150 mesh screen were used. The retained sorbent contained 6.5% of iron by weight and had a BET surface area of 178 m$^2$/g. The apparent bulk density was 0.85 gm/cc. This sorbent can sorb NO in presence of oxygen as prepared above. However, for many runs prior to sorption of NO, the iron oxide was reduced with 1.6% CO at 450°C for 3 minutes. The reduced supported iron oxide can sorb NO with or without $O_2$.

| BREAKTHROUGH DATA FOR REDUCED IRON OXIDE | |
|---|---|
| Temperature | 195°C |
| Flowrate | 0.3 lpm |
| Wt. of sample | 2.267 gm |
| Space velocity | 7140 hr |
| Nitric oxide conc. | 918 ppm |
| Oxygen conc. | 3.2% |
| time to break through | 14 min. |

| Time (min) | Outlet conc. (ppm) |
|---|---|
| 16 | 55 |
| 18 | 104 |
| 20 | 230 |
| 22 | 305 |
| 24 | 443 |
| 26 | 565 |
| 28 | 660 |
| 30 | 740 |

Capacity to break through is 2.7 × 10$^{-3}$ g NO/g sample Capacity to $(C_{out}/C_{in}) = 0.85$ is 4.07 × 10$^{-3}$ g NO/g sample Even in the presence of $CO_2$ (12.5%) and moisture (55°F dewpoint), the sorbent is still effective for sorbing NO regeneratively, as seen below

| BREAK THROUGH DATA FOR REDUCED IRON OXIDE, IN THE PRESENCE OF $CO_2$ AND MOISTURE | |
|---|---|
| Temperature | 195°C |
| Flowrate | 3.7 lpm |
| Wt. of sample | 2.267 g |
| Space velocity | 88000 hr$^{-1}$ |
| Nitric oxide conc. | 740 ppm |
| Oxygen conc. | 2.4% |
| $CO_2$ conc. | 12.5% |
| Moisture content | 55°F dewpoint |
| time to break through | 2 min. |

| Time (min) | Outlet conc. (ppm) |
|---|---|
| 3 | 180 |
| 4 | 392 |
| 5 | 514 |
| 6 | 580 |
| 7 | 613 |
| 8 | 638 |
| capacity to break through | 3.2×10$^{-3}$ g NO/g sample |

COMPARATIVE EXPERIMENTS

In a series of comparative experiments, the following potential sorbents were tested I. silica gel — Sargent Welch SC14616, 28–200 mesh
II. alumina — aluminum oxide "C" from DeGussa, Inc.
III. cobalt oxide — Harshaw catalyst Co0501 T
IV. chromium oxide — J. T. Baker $Cr_2O_3$, 20% by weight, ground in ball mill with alumina.
V. ferric oxide A — Harshaw catalyst FE0303 P
VI. ferric oxide B — J. T. Baker $Fe_2O_3$, 20% by weight, ground in a ball mill with alumina.
VII. nickel oxide — Harshaw catalyst N10707 T
VII. lead dioxide — J. T. Baker $PbO_2$, 40% by weight in alumina Each sorbent to be tested was held in place in one arm of a U-shaped drying tube between two lumps of glass wool. The length of each sorbent tested was about 1.5 cm. and the volume was about 1.5 cc. The U-shaped drying tube was positioned in an oil bath maintained at a relatively constant temperature. A stream of nitrogen dioxide-nitrogen mixture containing 3250 ppm $NO_2$ and 3% $O_2$ flowed through each sorbent at a rate of 0.6 lpm. all $NO_x$ in the outlet stream was converted to NO by a $NO_x$ converter (manufactured by Thermo Electron Co.) and the NO concentration was then measured by an infrared analyzer (LIRA 200, manufactured by MSA).

The sorbents were regenerated by heating the sorbent to 400°C and contacting the sorbent with a continuously flowing nitrogen stream flowing at a rate of about 0.6 lpm. The sorbents were completely regenerated in 15 minutes as indicated by the lack of detectable amounts of $NO_x$ in the outlet stream.

Figure 2:
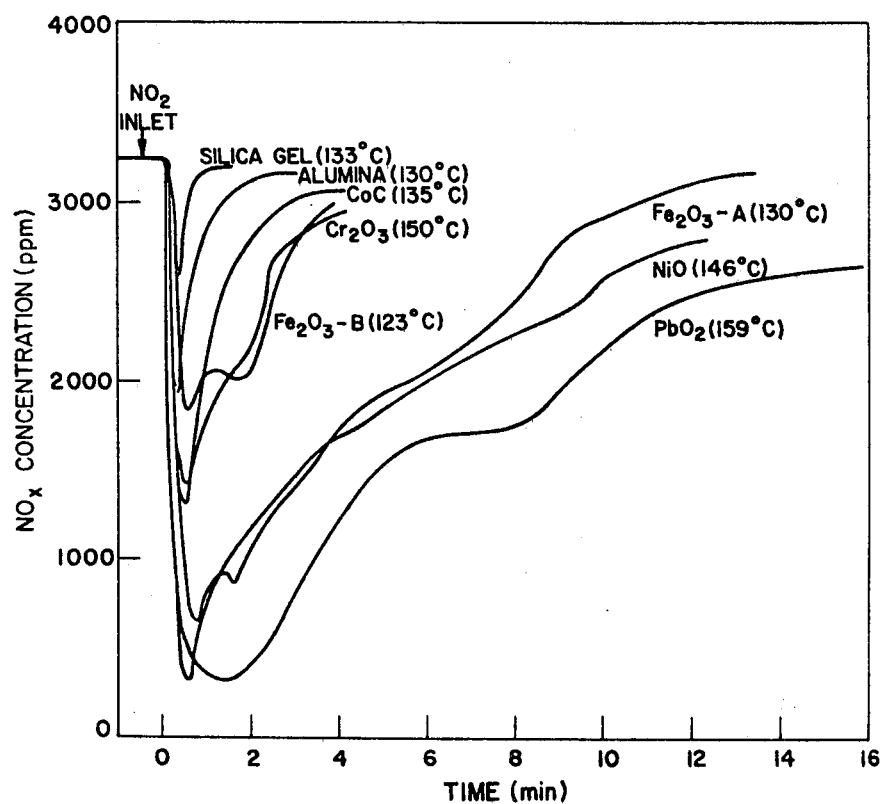
Figure 3:
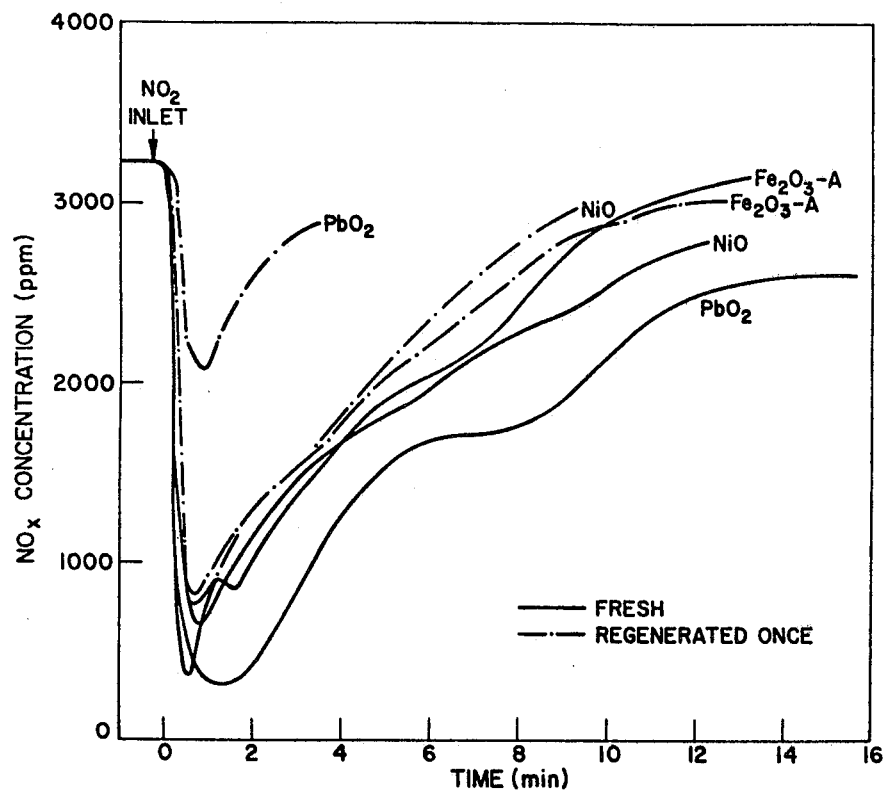

The results obtained are graphically represented in FIGS. 2 and 3. FIG. 2 illustrates that an alumina supported $Fe_2O_3$ ($Fe_2O_3$-A) is a substantially better sorbent than a mere mixture of $Fe_2O_3$ and alumina ($Fe_2O_3$-B), $SiO_2$ gel, alumina per se, cobalt oxide and chromium oxide. The slight temperature differences used in evaluating each sorbent in the range tested does not account for the substantial differences noted. In fact, it is believed that it would be difficult to measure any difference at all.

Although FIG. 2 shows that, initially, a supported $Fe_2O_3$ sorbent is substantially equivelent to a supported NiO or $PbO_2$ sorbent, FIG. 3 clearly illustrates that at the conditions tested, the $PbO_2$ sorbent, as a practical matter cannot be regenerated and the NiO sorbent shows a substantial reduction in activity. In contrast, the $Fe_2O_3$ sorbent shows no perceptible decline in activity.

We claim as our invention:

1. A process for the removal of oxides of nitrogen present in small amounts in a gas stream selected from a flue gas stream or an internal combustion engine exhaust stream containing at least 1% oxygen which comprises:
   i. contacting, in a sorption step the gas stream with a ferric oxide sorbent supported on a porous alumina support under conditions sufficient to sorb oxides of nitrogen on said sorbent including a temperature of about 0°C to about 350°C,
   ii. terminating said sorption step;
   iii. thermally regenerating said sorbent at a temperature of about 400°C to about 500°C with an inert gas stream to remove the sorbed oxides of nitrogen and to produce a gas stream containing the sorbed oxides of nitrogen; and
   iv. repeating the sorption step.

2. A process as in claim 1 wherein said gas stream contains about 50 to 1000 ppm oxides of nitrogen.

3. A process as in claim 1 wherein said sorbent contains about 5 to 10% by weight iron oxide.

* * * * *